United States Patent
Reddy Asani et al.

(10) Patent No.: US 10,047,635 B2
(45) Date of Patent: Aug. 14, 2018

(54) SUPPORT ASSEMBLY FOR TURBINE SHIPPING/OPERATION

(71) Applicant: General Electric Company, Schenectady, NY (US)

(72) Inventors: Likhith Reddy Asani, Karnataka (IN); Dinesh Venugopal Setty, Karnataka (IN); Jeffrey Patrick Mills, Greenville, SC (US); Nicholas Demianovich, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 15/171,838

(22) Filed: Jun. 2, 2016

(65) Prior Publication Data

US 2017/0350278 A1 Dec. 7, 2017

(51) Int. Cl.
*F01D 25/28* (2006.01)
*F16M 5/00* (2006.01)
*F16M 7/00* (2006.01)

(52) U.S. Cl.
CPC ............ *F01D 25/28* (2013.01); *F16M 5/00* (2013.01); *F16M 7/00* (2013.01); *F05D 2220/30* (2013.01); *F05D 2260/02* (2013.01)

(58) Field of Classification Search
USPC ............ 248/676, 677, 678, 673, 346.5, 121, 248/176.1; 410/46, 49, 44, 47, 120; 269/47, 48, 48.1, 48.2, 50, 52, 902, 289 R
See application file for complete search history.

(56) References Cited

U.S. PATENT DOCUMENTS

| | | | | |
|---|---|---|---|---|
| 2,885,165 | A | * 5/1959 | Smolen | F16M 5/00 248/671 |
| 3,194,525 | A | 7/1965 | Webb | |
| 4,549,722 | A | * 10/1985 | Gagliano | B66F 5/04 254/134 |
| 6,098,974 | A | * 8/2000 | Dolgas | H02K 15/165 269/296 |
| 6,292,999 | B1 | 9/2001 | Rossway et al. | |
| 6,298,536 | B1 | 10/2001 | Rossway et al. | |
| 6,591,665 | B2 | 7/2003 | Sondey | |
| 7,963,542 | B2 | 6/2011 | Doll et al. | |
| 8,876,448 | B1 | 11/2014 | Hess et al. | |
| 8,961,085 | B2 | * 2/2015 | Ressel | B60P 3/40 410/44 |

FOREIGN PATENT DOCUMENTS

WO     WO 97/19851     6/1997

\* cited by examiner

*Primary Examiner* — Alfred J Wujciak
(74) *Attorney, Agent, or Firm* — James W. Pemrick; Ernest G. Cusick; Frank A. Landgraff

(57) ABSTRACT

A support assembly supports a gas turbine in a manufacturing configuration, a shipping configuration and an operating configuration. The support assembly includes a stand leg securable to a base, where the stand leg includes a turbine casing interface with a slot sized to receive a turbine casing pin. A support plate attachable to the turbine casing interface includes a pin aperture that is sized to fit over the turbine casing pin in the slot.

2 Claims, 8 Drawing Sheets

SUPPORT ASSEMBLY FOR TURBINE SHIPPING/OPERATION

BACKGROUND OF THE INVENTION

The invention relates to a support configuration for shipping and operating a turbine and, more particularly, to a support configuration that facilitates a connection to a turbine for transporting and supporting the turbine.

Turbine installation and assembly involve multiple lifts between shipping to operating configurations when manufacturing, during transportation, at testing facilities, and during final assembly and installation in the field. During shipment, turbines are subjected to loads in the axial, lateral, and vertical directions. The turbines are typically supported at three points during shipment. The forward two points typically must react to forward, backward, downward, and upward loading. Upon arrival to the customer site, the turbine must be transferred from its shipping vessel to its operating location in the plant, typically via gurney or crane lift.

It would be desirable to minimize the amount of time it takes to disconnect the gas turbine from the shipping stand and move it to the operating location, as this is part of the critical path of the installation. This process and problem may be similar during shipping at multiple instances.

Traditionally, turbine bases are the same for shipping and operation. The turbine base is designed for both shipping and operating loads having numerous welds. Extensive inspections take major time in manufacturing. The piping installation at site starts only after turbine alignment, which is in the turbine cycle critical path. Turbine alignment involves precise landing, requires jacking post(s) for lateral alignment, fixator failure and extensive site labor. Scaling (size and weight) for higher frame sizes encounter challenges in shipping and crane capacity.

BRIEF SUMMARY OF THE INVENTION

In an exemplary embodiment, a support assembly supports a gas turbine in a manufacturing configuration, a shipping configuration and an operating configuration. The support assembly includes a stand leg securable to a base, where the stand leg includes a turbine casing interface with a slot sized to receive a turbine casing pin. A support plate attachable to the turbine casing interface includes a pin aperture that is sized to fit over the turbine casing pin in the slot.

In another exemplary embodiment, a support assembly includes a two-point support structure securable to a base that is sized and configured to receive turbine casing pins on opposite sides of a turbine. The two-point support plate supports downward loading, forward loading and backward loading during shipping. A support plate attachable to the two-point support structure mitigates upward loading during shipping.

In yet another exemplary embodiment, a support assembly includes a manufacturing base for supporting a gas turbine in a manufacturing configuration, and a pair of manufacturing stand legs secured to the manufacturing base. The manufacturing stand legs are spaced apart on the manufacturing base by a distance between turbine casing pins on opposite sides of the gas turbine. Each of the stand legs includes a turbine casing interface with a slot sized to receive one of the turbine casing pins. A pair of manufacturing stand support plates are one each attachable to a corresponding one of the turbine casing interfaces. Each of the manufacturing stand support plates includes a pin aperture that is sized to fit over the turbine casing pin in the slot. The support assembly also includes a shipping base for supporting a gas turbine in a shipping configuration, and a pair of shipping stand legs secured to the shipping base. The shipping stand legs are spaced apart on the shipping base by a distance between turbine casing pins on opposite sides of the gas turbine. Each of the stand legs includes a turbine casing interface with a slot sized to receive one of the turbine casing pins. A pair of shipping stand support plates are one each attachable to a corresponding one of the turbine casing interfaces. Each of the shipping stand support plates includes a pin aperture that is sized to fit over the turbine casing pin in the slot. The support assembly also includes an operating base for supporting the gas turbine in an operating configuration, and a pair of operating stand legs secured to the operating base. The operating stand legs are spaced apart on the operating base by the distance between turbine casing pins on opposite sides of the gas turbine. Each of the stand legs includes the turbine casing interface with the slot sized to receive one of the turbine casing pins. A pair of operating stand support plates are one each attachable to a corresponding one of the turbine casing interfaces. Each of the operating stand support plates includes the pin aperture that is sized to fit over the turbine casing pin in the slot.

DETAILED DESCRIPTION OF THE INVENTION

Figure 1:
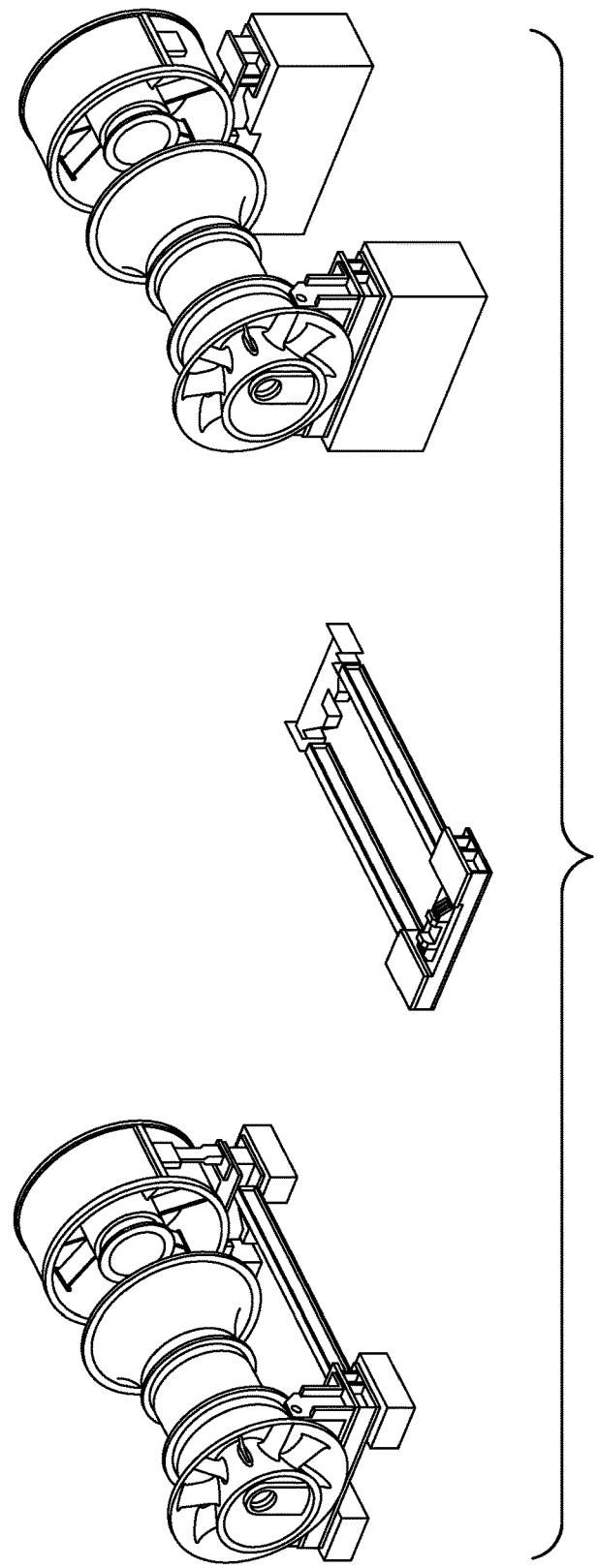
FIG. 1 shows a current approach for supporting a turbine during transport and operation.

FIG. 1 shows the current approach for supporting a gas turbine during transport and transferring the gas turbine from the transport support to an operating platform or base. As noted above, the support bases require numerous welds and extensive inspections, which consume manufacturing time. Moreover, after arriving at a customer site, the turbine is first preliminarily aligned for grounding of fixators. Subsequently, axial beams are removed and combustion cans are installed. For a gas turbine, piping installation at the customer site starts only after turbine alignment, which is also time-consuming. In addition to alignment, the legs supporting the turbine during shipping are typically connected to the base using approximately forty (40) large bolts. The oversized holes for the bolts require thick washers, which increases costs. Once all the bolts are disconnected, a corresponding number of bolts must be reconnected at the operating base.

Figure 2:
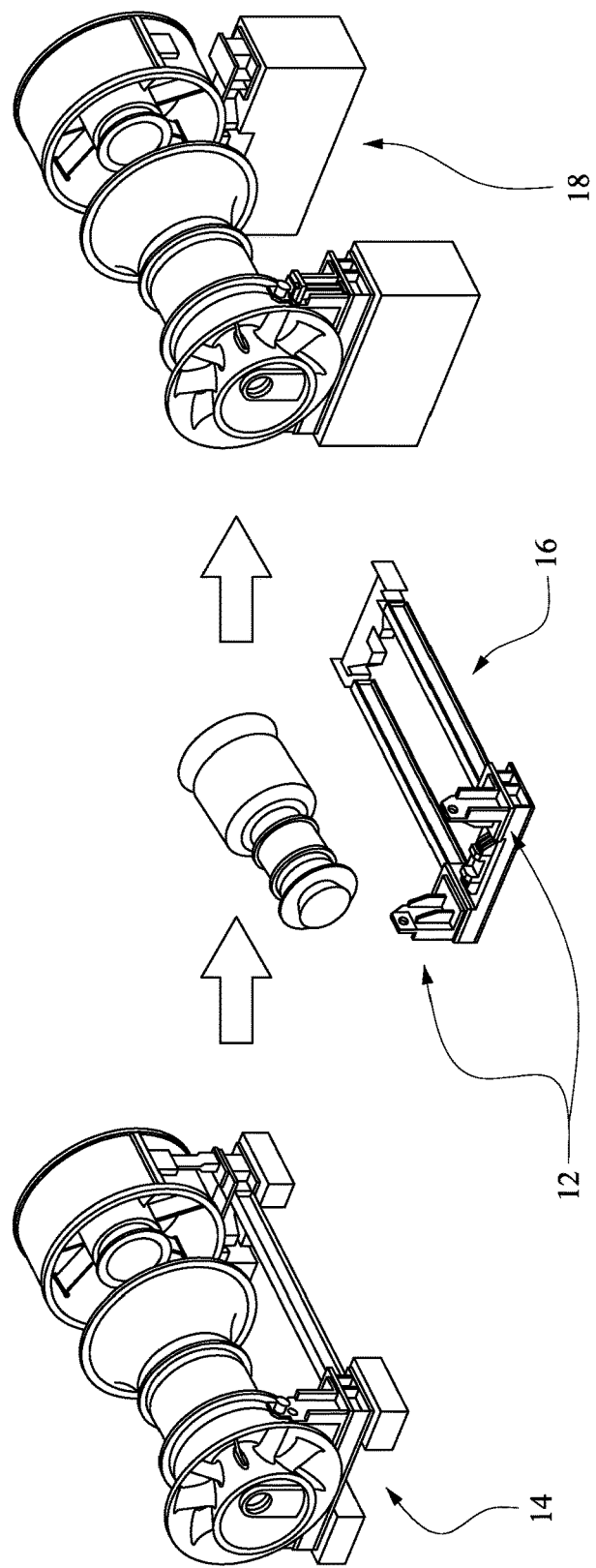
FIG. 2 shows an approach according to the described embodiments.
Figure 3:
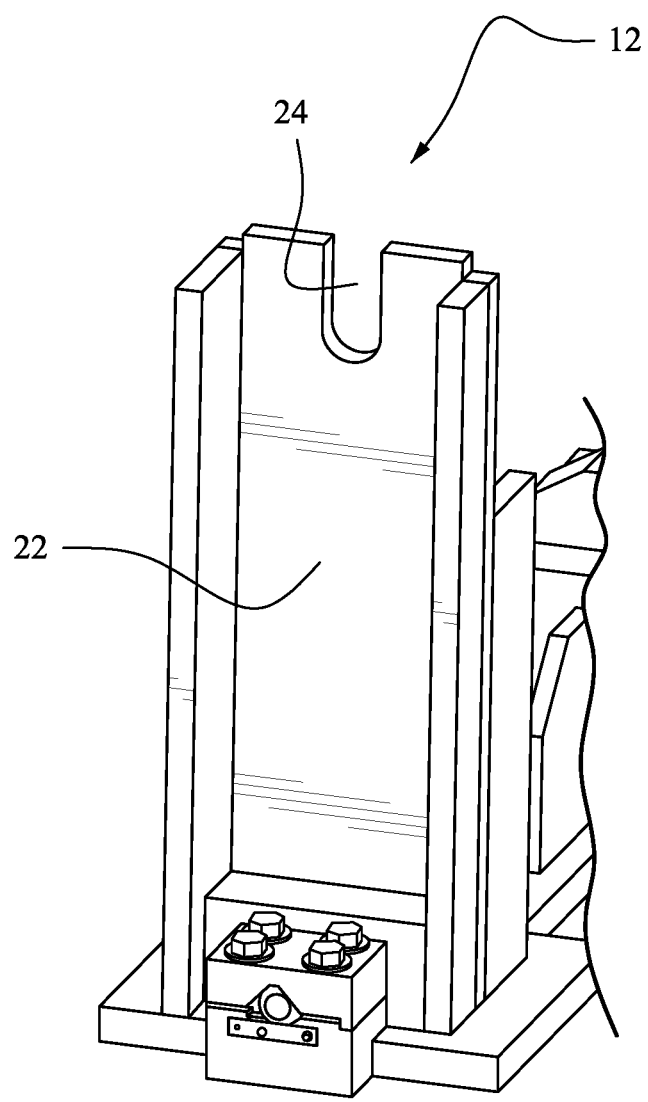
FIGS. 3-6 show details of the support assembly according to the described embodiments and the process for supporting the turbine.
Figure 4:
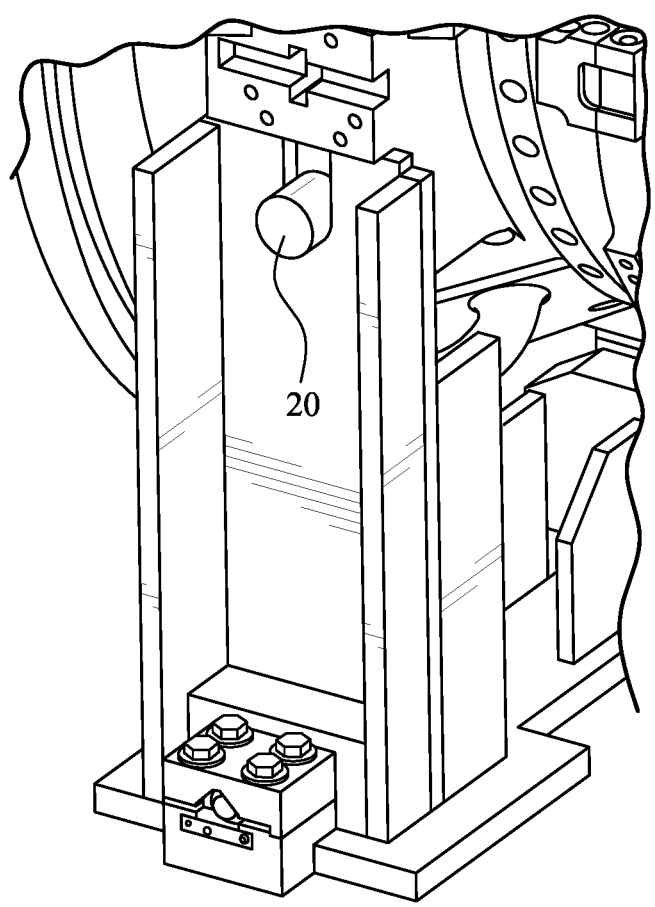
Figure 5:
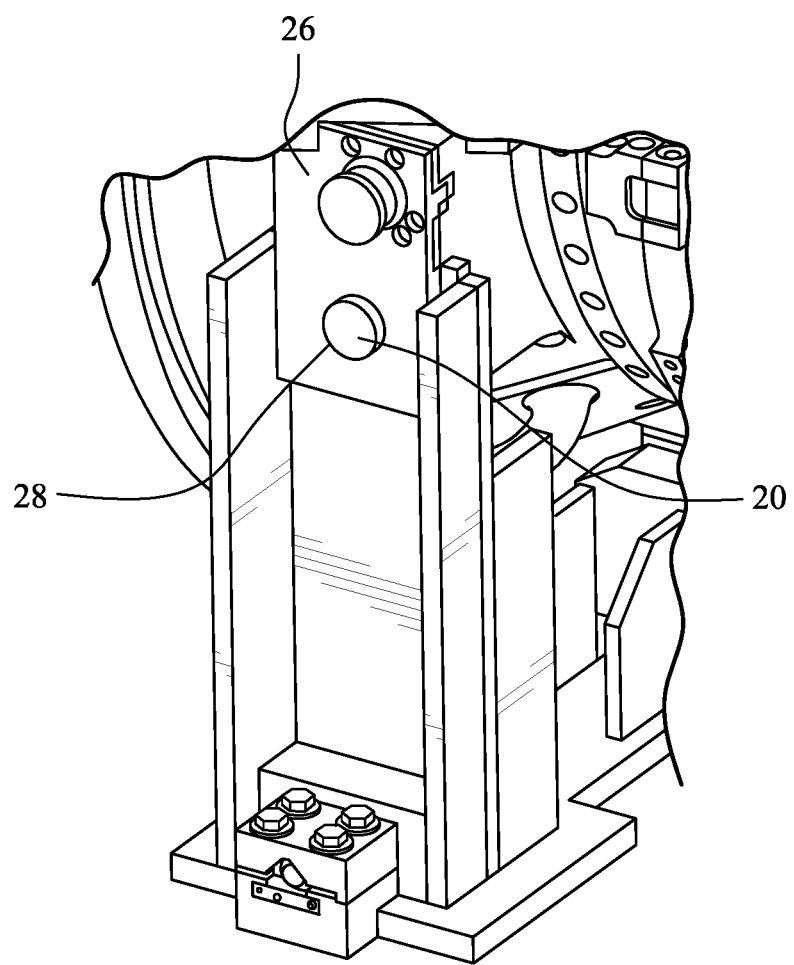

FIG. 2 shows an exemplary approach according to the described embodiments. As shown in FIG. 2, stand legs 12 are provided for both a shipping base 16 and an operating base 18 and remain connected. The stand legs 12 may also be incorporated into the manufacturing base 14. The stand legs 12 are provided with structure to facilitate alignment and connections (described in more detail below).

The stand legs 12 are shown in more detail in FIGS. 3-6. Each stand leg 12 is respectively securable to a base 14, 16, 18. The stand legs 12 are spaced apart on each of the bases

14, 16, 18 by a distance between turbine casing pins 20 (FIG. 4) on opposite sides of the gas turbine. Each stand leg 12 includes a turbine casing interface 22 with a slot 24 that is sized to receive the turbine casing pin 20.

Figure 6:
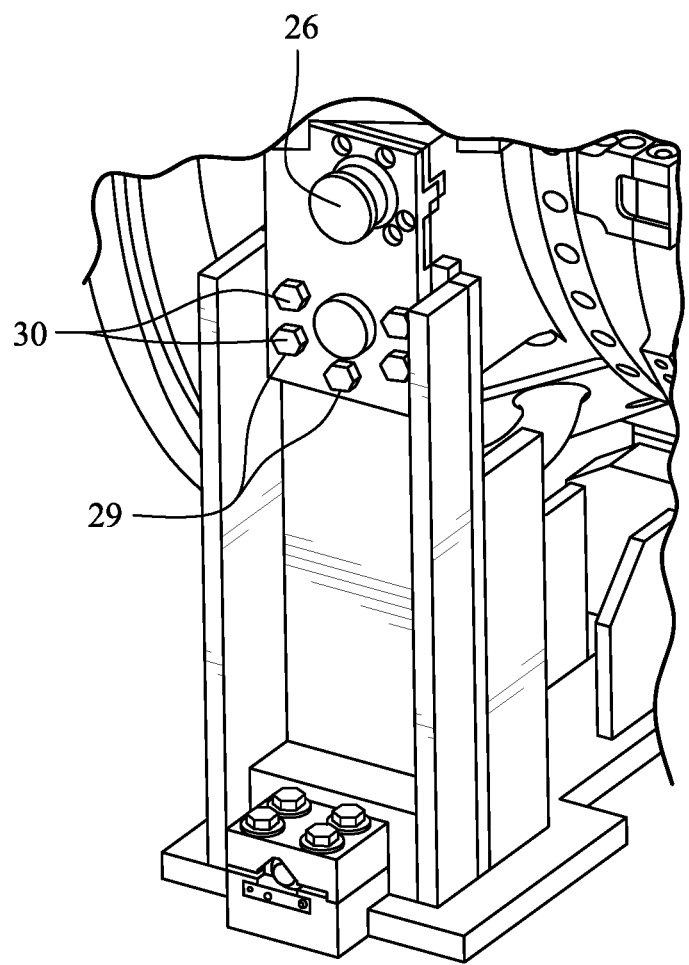

A support plate 26 is attachable to the turbine casing interface 22. The support plate 26 includes a pin aperture 28 that is sized to fit over the turbine casing pin 20 in the slot 24. As shown, in some embodiments, the slot 24 is U-shaped being open to receive the turbine casing pin 20 from above. As shown in FIG. 6, the support plate 26 may be secured to the turbine casing interface 22 with bolts 30 such as "quick release" bolts. Quick release bolts are light weight bolts that aid in easy assembly and disassembly of the gas turbine from the supporting base. These bolts are designed to withstand the shipping loads and prevent the casing and rotor from twisting during transportation. The support plate 26 includes a plurality of bolt apertures 29 positioned adjacent the pin aperture 28. A plurality of bolts 30 secure the support plate 26 to the turbine casing interface 22 through the bolt apertures 29.

Each pair of stand legs 12 represents a two-point support structure for the gas turbine. The slots 24 facilitate alignment of the turbine on the base. Moreover, with the turbine supported by the stand legs 12, before the support plate 26 is secured, the turbine may be displaced/rotated on the casing pins 20 as pivots to facilitate alignment. This structure facilitates the vertical adjustments required for single shaft and multi-shaft machines during initial alignment and maintenance.

The stand legs 12 support the downward loading of the turbine on the base 14, 16, 18. The stand legs 12 also support forward and backward loading via the slot 24 interface to the casing pin 20 on the turbine casing. The slot 24 allows the turbine to be simply supported and picked up quickly from the base 14, 16, 18. The support plate 26 serves to mitigate upward loading. The support plate 26 may utilize the quick release bolts such that the support plate 26 can be easily removed allowing the turbine to be lifted from the base. By comparison to the forty (40) or so bolts required in the existing configuration, in some embodiments, only ten (10) bolts are utilized to secure the stand legs 12.

Figure 7:
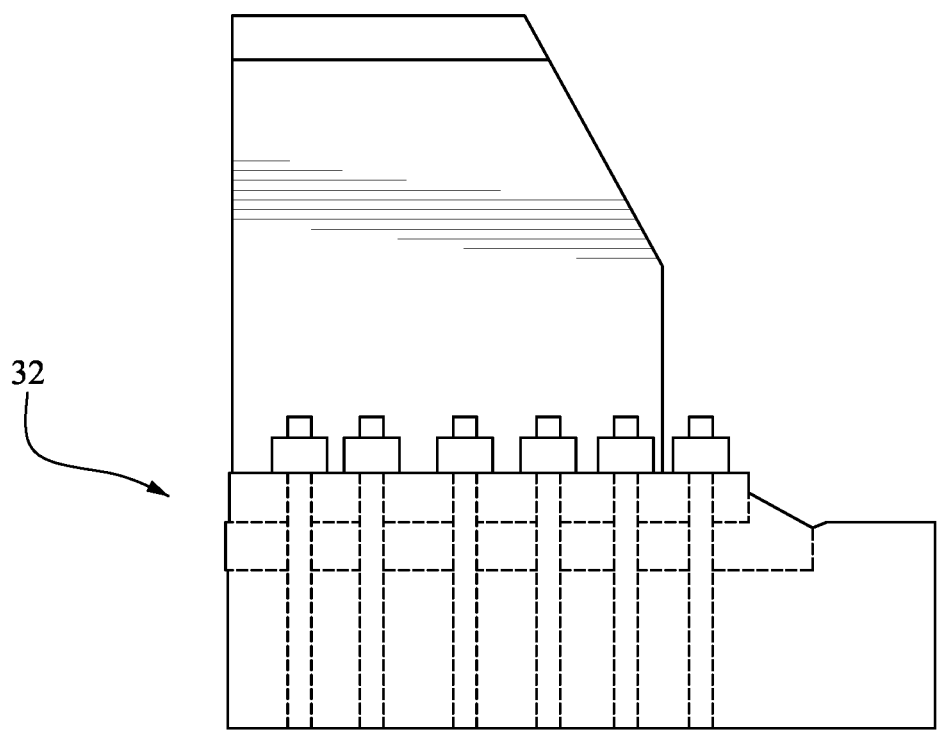
FIGS. 7 and 8 show an alternate design.
Figure 8:
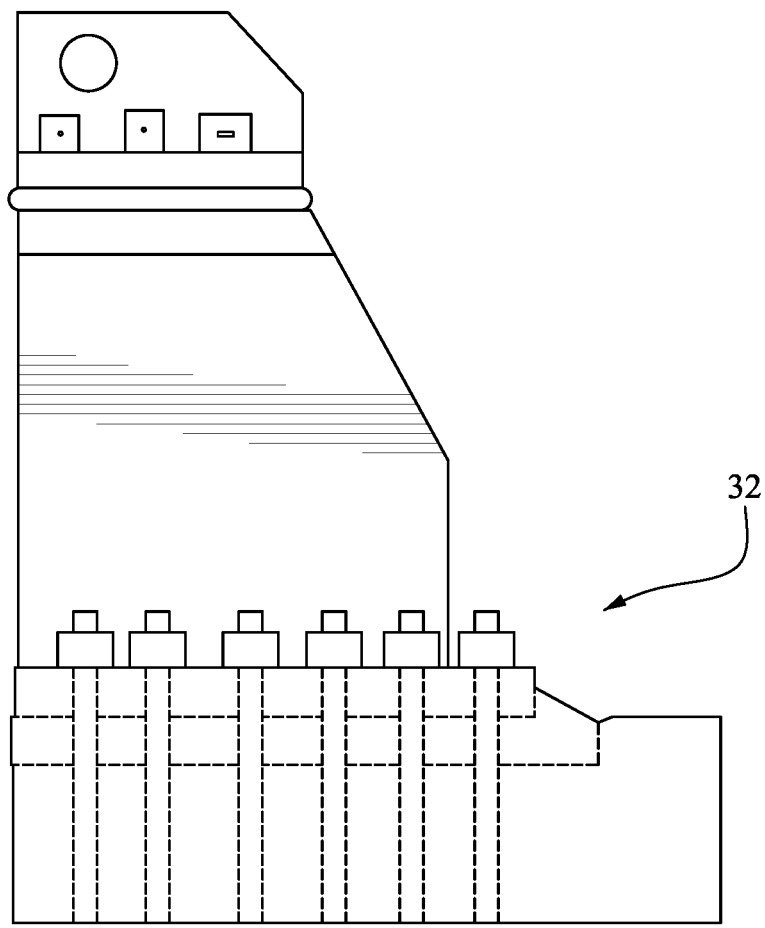

The support connection can be horizontal or vertical based on the shipping envelope limitations. FIGS. 7 and 8 show an alternate design that meets the same requirement. As shown, the design provides a horizontal bolting interface 32 similar to the above-described embodiments, except for the support connection being attached to the casing. The gap between the support connection and supporting leg can be shimmed for vertical adjustments.

The described embodiments solve the challenge of ensuring a robust manufacturing/shipping load support while minimizing the time for disconnection and transfer between configurations. Light weight pins and components enable easy transfer of the turbine from manufacturing to shipping configurations, shipping to operating configurations and special transport vehicles. The described support assembly saves turbine installation time in critical path once the operating base is pregrouted. Moreover, the pin design facilitates manufacturing shop assembly to ensure the tolerance stack up before shipping to the operating site.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A support assembly for supporting a gas turbine, comprising:
    a manufacturing base for supporting the gas turbine in a manufacturing configuration;
    a pair of manufacturing stand legs secured to the manufacturing base, the manufacturing stand legs being spaced apart on the manufacturing base by a distance between turbine casing pins on opposite sides of the gas turbine, wherein each of the stand legs includes a turbine casing interface with a slot sized to receive one of the turbine casing pins;
    a pair of manufacturing stand support plates one each attachable to a corresponding one of the turbine casing interfaces, each of the manufacturing stand support plates including a pin aperture that is sized to fit over the turbine casing pin in the slot;
    a shipping base for supporting the gas turbine in a shipping configuration;
    a pair of shipping stand legs secured to the shipping base, the shipping stand legs being spaced apart on the shipping base by a distance between turbine casing pins on opposite sides of the gas turbine, wherein each of the stand legs includes a turbine casing interface with a slot sized to receive one of the turbine casing pins;
    a pair of shipping stand support plates one each attachable to a corresponding one of the turbine casing interfaces, each of the shipping stand support plates including a pin aperture that is sized to fit over the turbine casing pin in the slot;
    an operating base for supporting the gas turbine in an operating configuration;
    a pair of operating stand legs secured to the operating base, the operating stand legs being spaced apart on the operating base by the distance between turbine casing pins on opposite sides of the gas turbine, wherein each of the stand legs includes the turbine casing interface with the slot sized to receive one of the turbine casing pins;
    a pair of operating stand support plates one each attachable to a corresponding one of the turbine casing interfaces, each of the operating stand support plates including the pin aperture that is sized to fit over the turbine casing pin in the slot.

2. A support assembly according to claim 1, wherein the slots are U-shaped slots in the turbine casing interfaces, the U-shaped slots being open to receive the turbine casing pins from above.

* * * * *